Oct. 7, 1969  F. J. KALOG  3,470,653
SELECTIVE ELECTROMECHANICAL OPERATOR
Filed Nov. 15, 1966  4 Sheets-Sheet 1

INVENTOR.
FRANCIS J. KALOG
BY Lindsey, Prutzman and Hayes
ATTORNEYS

Oct. 7, 1969 — F. J. KALOG — 3,470,653
SELECTIVE ELECTROMECHANICAL OPERATOR
Filed Nov. 15, 1966 — 4 Sheets-Sheet 2

Oct. 7, 1969     F. J. KALOG     3,470,653
SELECTIVE ELECTROMECHANICAL OPERATOR
Filed Nov. 15, 1966     4 Sheets-Sheet 3 fig. 6

| LINE | Condition | A ENTRANCE CARPET | B EXIT OR SAFETY CARPET | C FOWARD MOTOR | D CONTROL | E REVERSE MOTOR | F LOW SPEED | G RECYCLE | H REVERSE CONTROL | I REVERSE DOOR CLOSING | J LOCKING | K REVERSE DOOR OPENING | L REVERSE CONTROL | M MASTER SAFETY | S-1 | S-2 | S-3 | S-4 | S-5 | S-6 | TWO WAY SWITCH |
|---|---|---|---|---|---|---|---|---|---|---|---|---|---|---|---|---|---|---|---|---|---|
| | FORWARD (CLOCKWISE) DOOR OPENING | | | | | | | | | | | | | | | | | | | | |
| 1 | POWER ON DOOR AT 0° | D | D | D | E | D | D | D | D | D | E | D | D | E | L | R | L | L | L | R | L |
| 2 | NORMAL OPENING 0° TO APPROX. 30° | E | E | E | E | D | D | D | D | D | E | D | D | E | L | R | L | L | L | R | L |
| 3 | NORMAL OPENING AT 30° | E | E | E | E | D | E | D | D | D | E | D | D | E | L | L | L | L | L | R | L |
| 4 | NORMAL OPENING AT APPROX. 70° | E | D | E | D | D | E | E | D | D | E* | D | D | E | ◊R/L | L | R | R | L | R | L |
| 5 | NORMAL OPENING AT 90° | E | D | D | D | D | E | E | D | E/D* | E/D* | D | D | E | L | L | R | L | L | R | L |
| 6 | CARPETS CLEARED AT 90° | D | D | D | D | E | D | E | D | D | E | D | E | E | L | L | L | L | L | R | L |
| 7 | NORMAL CLOSING 90° TO APPROX. 30° | D | D | D | D | E | D | E | D | D | E | D | D | E | L | R | R | L | L | R | L |
| 8 | NORMAL CLOSING AT 30° | D | D | D | D | E | E | E | D | D | E | D | D | E | L | R | L | L | L | R | L |
| 9 | NORMAL CLOSING AT APPROX. 30° TO 1° | D | D | D | D | E | E | D | D | D | E* | D | D | E | ◊R/L | L | L | L | L | R | L |
| 10 | DOOR CLOSING AT 0° | D | D | D | E/D* | D* | D | D | D | D | E | D | D | E | L | L | L | R | L | R | L |
| | REVERSE (COUNTERCLOCKWISE) DOOR OPENING | | | | | | | | | | | | | | | | | | | | |
| 11 | SAFETY CARPET ENERGIZED | D | E | D | D | E | D | D | E | D | D | E | D | E | L | L | L | L | L | R | L |
| 12 | DOOR OPENING 0° TO APPROX. 30° | D | E | D | D | E | D | E | E | E | D | E | D | E | L | L | R | L | L | R | L |
| 13 | DOOR OPENING AT APPROX. 30° | D | E | D | D | E | D* | E | E | E | D | E | D | E | L | R | L | R | L | R | L |
| 14 | DOOR OPENING AT 70° | D | E | D | E/D* | E | E | E | E | D | E* | D | D | E | R | R | L | R | R | R | L |
| 15 | DOOR OPENING AT 90° | E | D | D | D | D | E | E | E | D | E | D | D | E | R | L | L | L | R | R | L |
| 16 | BOTH CARPETS CLEARED | D | D | D* | D | D | E | E | E | E | E | E | D | E | L | L | L | L | L | L | L |
| 17 | DOOR CLOSING 90° TO 70° | D | D | E | E | D | E | E | E | D | D | D | D | E | R | R | L | L | R | R | L |
| 18 | DOOR CLOSING AT APPROX. 70° | D | D | E | D* | D | E | D* | E | E | D | D | D | E | R | R | R | R | R | R | L |
| 19 | DOOR CLOSING AT APPROX. 30° | D | D | E | E | D* | E | D* | D* | D | E | D | D | E | L | L | R | L | R | R | L |
| 20 | DOOR CLOSING AT 0° | D | D | D* | D* | D* | D | D | D* | D | E* | D | D* | E | R | R | L | L | L | R | L |

◊ AFTER TIME DELAY
* MOMENTARY CONTACT

Oct. 7, 1969   F. J. KALOG   3,470,653
SELECTIVE ELECTROMECHANICAL OPERATOR
Filed Nov. 15, 1966   4 Sheets-Sheet 4 fig. 7

◊ AFTER TIME DELAY
\* MOMENTARY CONTACT

| LINE | Operation | A ENTRANCE CARPET | B EXIT OR SAFETY CARPET | C FOWARD MOTOR | D CONTROL | E REVERSE MOTOR | F LOW SPEED | G RECYCLE | H REVERSE CONTROL | I REVERSE DOOR CLOSING | J LOCKING | K REVERSE DOOR OPENING | L REVERSE CONTROL | M MASTER SAFETY | S-1 | S-2 | S-2a | S-3 | S-4 | S-5 | S-6 | S-9 | TWO WAY SWITCH |
|---|---|---|---|---|---|---|---|---|---|---|---|---|---|---|---|---|---|---|---|---|---|---|---|
| | SERVO CENTERING | D | D | D | E | E | D | D | D | D | D | D | D | E | L | L | R◊ | L | L | L | L | L | L |
| 1 | DOOR AT 0° COUNTERCLOCKWISE CLOSING | D | D | E* | E/◊* | D* | D | D | E | E* | D | D | E | E | L | R | R◊ | L | L | L | R | L | L |
| 2 | DOOR PASSING 0° POSITION C.C.W. CLOSING | D | D | D*E/◊* | D | | | | | | | | | | | | | | | | | | | |
| 3 | DOOR RETURNED TO 0° POSITION | D | D | D | E/◊* | D | D | D | D | D | E* | D | D | E | L | R | R | L | R | L | L | L | L |
| 4 | FOWARD CLOCKWISE DOOR OPENING 0° TO 30° | E | E | D* | D | D | D | D | D | D | D | E/◊* | D | D* | L | L | L | L | L | R | R | L | L |
| 5 | DOOR CLOSING C.C.W. APPROX. 20° TO 1° | D | D | D | D | E | D | D | E | D | D | E | E | E | L | R◊/L | L | L | L | R | R | L | L |
| 6 | REVERSE (C.CW) DOOR OPENING AT 1° | E | E | E* | E/◊* | D* | D | D | D | D | D | E | D | E | L | R◊/L | L | L | R | R | R | L | L |
| 7 | REVERSE DOOR OPENING 1° TO APPROX 30° | E | E | D | D | D | D | D | E | E | D | D* | E | E | L | L | L | L | R | R | L | L | L |
| 8 | RECYCLE FROM REVERSE DOOR OPENING 1° TO APPROX.30° | D | D | D | E/◊* | D* | D | D | E | E | D | D | D | E | L | L | L | L | L | L | L | L | L |
| 9 | DOOR CLOSING CLOCKWISE APPROX. 20° TO 1° | E | E | E | D | D | D | D | E | E | D | D | D | E | L | L | L | L | L | L | L | L | L |

United States Patent Office 3,470,653
Patented Oct. 7, 1969

3,470,653
SELECTIVE ELECTROMECHANICAL OPERATOR
Francis J. Kalog, New Britain, Conn., assignor to The Stanley Works, New Britain, Conn., a corporation of Connecticut
Filed Nov. 15, 1966, Ser. No. 594,476
Int. Cl. E05f 15/12
U.S. Cl. 49—139                                         24 Claims

ABSTRACT OF THE DISCLOSURE

An electromechanical door operator including a motor connected to the door through a reversible drive so that pressure applied to the door will cause the motor to rotate and a control circuit therefor which automatically provides for safe operation under all circumstances of normal and emergency use and is fail-safe upon power failure. The control circuit automatically energizes the motor to cause it to act as a brake when the door reaches its closed position from either direction of swing and then de-energizes the motor and energizes a brake solenoid to hold the door in closed position. The electric control circuit further energizes the motor to return the door to closed position any time it is displaced therefrom in either direction for any cause including wind or pressure differential. The circuit also energizes the motor for operation as an instantaneous brake where the position of users on opposite sides of the door make it unsafe for the automatic door cycle to continue and thereafter renders the door freewheeling so that it can be manually opened by the users for complete safety under panic conditions.

The control circuit has a built-in provision for the selection of either direction of swing and, upon power failure, automatically renders the operator freewheeling so the door can be manually opened in either direction and automatically connects a mechanical door closer to return the door to the closed position under such conditions.

---

The present invention relates to electromechanical door operators of the type commonly used for effecting timely opening and closing movement of a traffic responsive exit or entrance door.

It is a basic object of this invention to provide a new and improved electromechanical operator which is versatile to provide various modes of safe operation under manual and powered conditions. Included in this object is the provision of means for preventing engagement by the door of traffic approaching the door from either direction.

It is another object of this invention to provide an improved electromechanical door operator that is rapidly responsive and sensitive to the demands of the traffic therethrough and is adapted for automatic two-way operation of the door in a door opening direction away from the pedestrian.

It is a further object of this invention to provide an improved electromechanical operator incorporating a powered servo-centering arrangement whereby the operator will automatically seek its zero position if displaced therefrom for any reason. Included in this object is a provision of electric circuit means for controlling the motor of the operator to power the same to its zero position regardless of wind or stack pressures encountered and to lock the same in zero position.

Still another object of this invention is to provide an improved electromechanical door operator which provides for powered emergency door opening, as well as manual opening upon power failure, to provide egress through the door under all emergency or panic conditions. Included in this object is the provision of means for automatically returning the door to its closed position after manual emergency opening.

It is a further object of this invention to provide a door operator wherein the door is powered by the operator to its full open and full closed positions, is positively stopped by the operator in both positions and is positively locked at these positions.

Another object of this invention is to provide an improved powered door operator incorporating a control arrangement which automatically delays or alters the normal door cycle in response to traffic or other conditions encountered in use.

Other objects will be in part obvious and in part pointed out more in detail hereinafter.

The invention accordingly consists in the features of construction, combination of elements and arrangements of parts which is exemplified in the construction hereafter set forth, and the scope of the invention is indicated in the appended claims.

In the drawings:

FIGS. 6 and 7 are charts showing the operation of the relays and the position switches included in the control circuit under different operating sequences.

Figure 1:
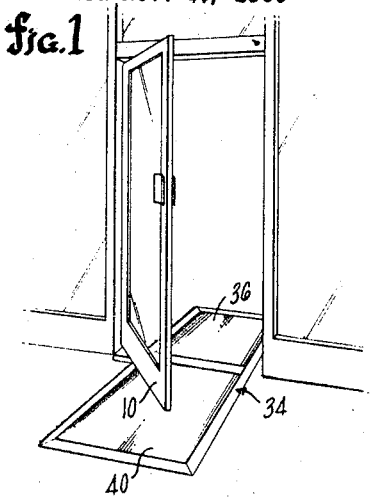
FIG. 1 is a perspective view of an illustrative swinging door installation incorporating the electromechanical operator of this invention.
Figure 2:
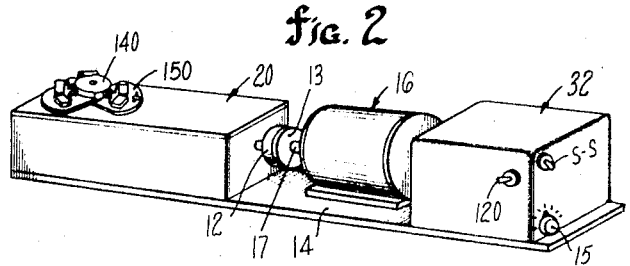
FIG. 2 is a schematic view of the electromechanical and control subassemblies of the operator of FIG. 1.

Referring to FIGS. 1 and 2, the electromechanical operator illustrating this invention is shown as being mounted above a doorway for opening and closing a door 10. As shown in FIG. 2, the mechanical components of the operator are mounted on a base plate 14 so that they may be installed and removed as a unit and include a reversible motor 16 which is of the alternating current capacitor type and has its output shaft 17 drivingly connected to reduction gearing 18 of final drive assembly 20. The final drive assembly 20 includes a downwardly depending output spindle 22 driven by the reduction gearing 18 and is shown as being positioned in axial alignment with the pivot axis of the door. Spindle 22 is drivingly connected to the door through a coupling recess (not shown) in the upper edge thereof for opening and closing the door.

Also shown as being mounted on the base plate 14 is an electrical control unit 32 which houses a major portion of the components of the electrical system for controlling the operation of the motor.

In order to provide a traffic responsive signal for energizing the motor 16 to operate the door 10, a conventional switch-type contact carpet 34 is shown in FIG. 1 as being provided. It is apparent that such a signal could also be provided by a conventional photoelectric sensing system or by other traffic-responsive switch means associated with the door.

As shown, the contact carpet 34 comprises two portions, an approach or entering carpet 36 which is adapted when walked upon to close an approach switch 38 (FIG. 5), and a hold or safety carpet 40 which is adapted to close the hold or safety switch 42 when depressed by the weight of a pedestrian or another object.

Figure 3:
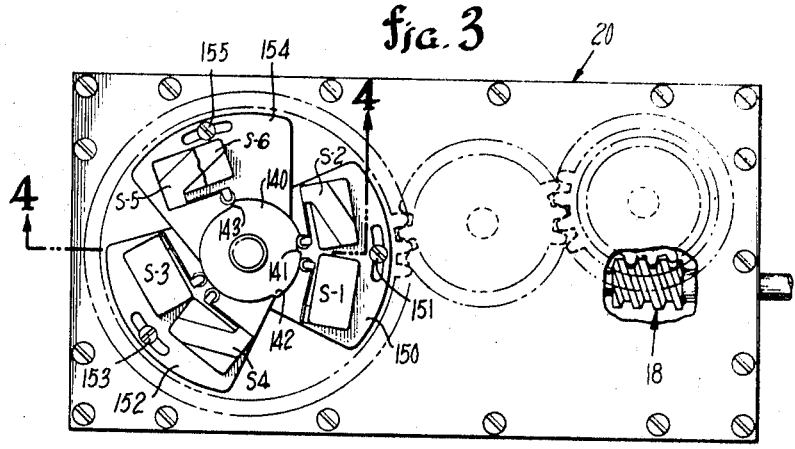
FIG. 3 is an enlarged top view partly broken away of the final drive assembly of the electromechanical operator of FIG. 2.

The reduction gearing 18 is connected to motor shaft 17 and, in turn, drives spindle 22 in a clockwise direction as seen in FIG. 3 when the motor 16 rotates in the forward or normal door opening direction at which time the door 10 swings over safety carpet 40. The reduction gearing 18 may be of any reversible drive type. That is to say, the powered rotation of the motor 16 will swing the door 10, and manual pressure applied to swing the door 10 will cause motor 16 to rotate.

Six door position or limit switches S–1, S–2, S–3, S–4, S–5 and S–6 are shown in FIG. 3 as being mounted for selective actuation by a cam 140 fixed to the spindle 22 for rotation therewith. The cam 140 includes a notch 141 and a pair of shoulders 142 and 143 to actuate switches S–1 through S–6 as hereinafter more fully described. Switches S–1 and S–2 are supported by a plate 150 which is adjustably mounted for angular movement about the axis of spindle 22 and is held in adjusted position by a screw 151. Switches S–3 and S–4 are similarly mounted on a plate 152 and held in adjusted position by a screw 153. Superposed switches S–5 and S–6 are similarly mounted on plate 154 which is held in adjusted angular position by screw 155.

As indicated above, the spindle 22 and the cam 140 are rotated in the clockwise direction as viewed in FIG. 3 for an angular distance of 90° as the door moves from a closed to an open position in the forward direction. The notch 141 of cam 140 is positioned relative to the door so that the limit switch S–2 is positioned therein when the door is closed. As the door 10 and cam 140 move in the clockwise direction, it will be seen that the shoulder 142 will engage damping switch S–4 after the door swings, say, 70° in the forward opening direction. Further movement of door 10 and cam 140 to a full 90° in the clockwise direction causes the shoulder 142 to actuate switch S–3 which serves as the open limit switch. During the door closing movement, the switch S–1, which is positioned to be actuated at, say, 20° or 30° before the door reaches a fully closed or zero position, is momentarily actuated to damp the door movement as hereinafter more fully provided. Position switches S–5 and S–6 serve no function in the normal operation of the door; however, these switches are actuated by shoulder 143 in the event of any overtravel of the door beyond the zero position after returning to zero position in forward operation to condition the control circuit for powered servo-centering under such conditions. In addition to the foregoing, switch S–1 also is actuated by the shoulder 142 to serve to damp the door before it reaches its open position during reverse or counterclockwise operation of the door and S–2 is actuated by the same shoulder 142 to serve as an open limit switch under such operation.

By virtue of the construction of the cam 140 and the position of the control or limit switches S–1, S–2, S–3 and S–4 the door may easily be made opposite handed by the simple expediency of flipping the cam upside down at which time the actuating arm of switch S–3 is seated in the notch 141 at zero or closed position of the door. When the cam is so seated and the leads for switches S–1 and S–4, and for S–3 and S–2, interchanged, the door will automatically rotate counterclockwise.

Figure 4:
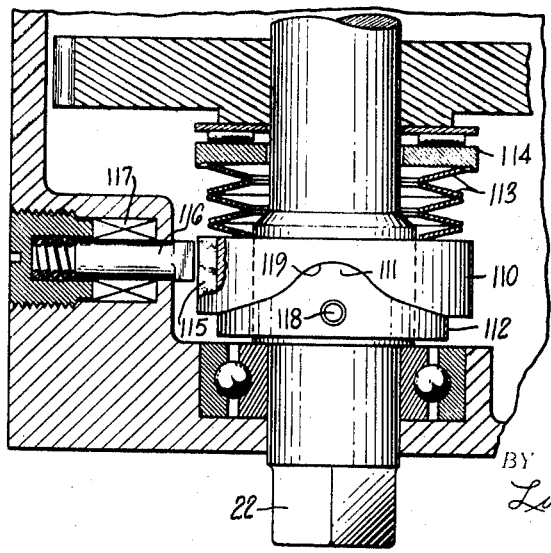
FIG. 4 is a still further enlarged fragmentary cross-sectional view of the final drive assembly taken along the line 4—4 of FIG. 3.

Referring now to FIG. 4, there is illustrated a door closer arrangement for returning the door to closed position after it is opened with power turned off as, for example, under emergency conditions. The door closer comprises a pair of interfitting cam washers 110 and 112 and a stack of Belleville washers 113 positioned around spindle 22 between a thrust member 114 and upper washer 110 which is longitudinally slidable on the shaft. The upper washer 110 is provided with a longitudinal slot 115, and a solenoid operated locking pin 116 is adapted to be received in the slot 115 to lock the washer 110 against rotative movement when the solenoid 117 is de-energized as, for example, on power failure. Lower washer 112 is fixed to spindle 22 to rotate therewith as by pin 118. The mating surfaces of cam washers 110 and 112 are provided respectively with a pair of diametrically disposed V-shaped recesses 119 and a pair of complementary V-shaped lugs 111. It will be observed that the complementary recesses and lugs have compound mating surfaces having increased slope as the lugs and recesses approach fully seated position to provide an increased mechanical advantage. The use of compound mating surfaces automatically compensates for the lower spring force of Belleville washers 113 as the stack of Belleville washers expands when the cam washers 110 and 112 are fully seated as illustrated in FIG. 4.

Referring again to FIG. 2, the schematically illustrated locking brake comprises a relatively stationary solenoid brake member 12 and an axially movable disc member 13 which is mounted to rotate with shaft 17. The energization of stationary solenoid brake member 12 attracts the disc 13 to cause the same to frictionally engage stationary member 12 to lock the shaft 17 and hence the associated door 10 against movement. The locking force may be adjusted to any desired level by means of rheostat 15 to maintain the door against movement regardless of wind or stack pressure encountered.

Figure 5:
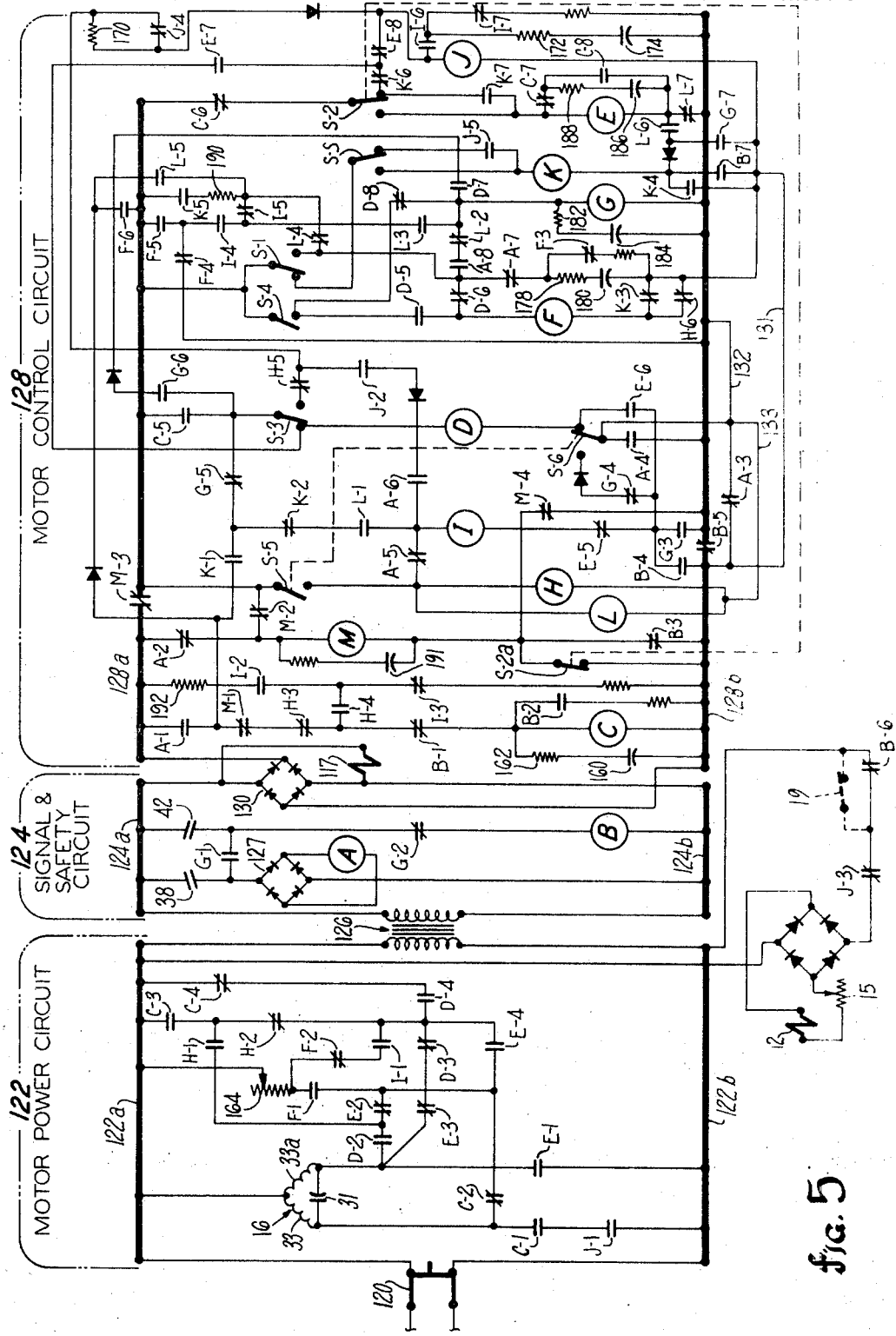
FIG. 5 is a schematic diagram of the electrical control system of the electromechanical operator of this invention.

FIG. 5 illustrates an electrical control system for controlling the electromechanical operator. The control system includes a master switch 120 for connecting the system to an electrical power source such as a conventional 110–120 AC volt source. Generally, the electrical control system includes three circuits: a motor power circuit designated 122 having a pair of buses 122a and 122b connected directly to the AC source through the master switch 120, a signal and safety circuit designated 124 having a pair of buses 124a and 124b connected to the AC source through master switch 120, a step down transformer 126; and a motor control circuit designated 128 having a pair of buses 128a and 128b connected to the output of the transformer 126 through a rectifier bridge 130.

In FIG. 5, the switches and relay contacts are illustrated as being either open or closed to correspond with their condition when the master switch 120 and the door 10 are closed and neither approach switch 38 nor safety switch 42 is actuated. As indicated in line 1 of the chart of FIG. 6, master safety relay M and locking relay J are energized under these conditions.

To facilitate the understanding of the invention, each of the contacts have been numbered to correspond with the associated relay. In other word, when relay A, for example, is energized, each of the contacts A–1, A–2, etc., which are shown in FIG. 5 as being open, are closed and those which are shown as being closed are opened. In this connection, it should be borne in mind that under such circumstances, locking relay J and master relay M are energized, and their associated contacts are as illustrated. Moreover, the buses 122a and 122b, buses 124a and 124b, and except for opening of contacts M–3 and B–5 under certain conditions, buses 128a and 128b are energized so that any electric element between these respective buses is energized when the associated circuit is completed therebetween.

Accordingly, with the main switch 120 closed, the solenoid 117 will be energized to permit the free movement of cam washer 110 (FIG. 4), and solenoid brake 12 is energized to positively lock the door in closed position. As indicated above, with the master switch 120 and the door 10 closed and no traffic on the carpet 34, master relay M is energized through contacts A–2 and B–3, respectively, and locking relay J is energized through contacts C–6, door position switch S–2, contacts K–6 and E–8, and shunt conductor 131, it being understood that buses 128a and 128b are energized to opposite polarity.

The normal opening and closing cycle of the door 10 is initiated by the closing of the approach switch 38 by traffic passing onto the entering carpet 36.

The closing of approach switch 38 energizes entrance carpet relay A through rectifier bridge 127 and closes contacts A–1 to complete the circuit through forward motor relay C and its time delay circuit comprising capacitor 160 and resistor 162. Relay C in turn closes contacts C–5 to energize control relay D through position switches S–3 and S–6 and contacts A–4. Further, relay C being energized opens contacts C–6 to de-energize locking relay J to open contacts J–3 to de-energize brake 12 and close contacts J–1 of the motor power circuit 122. Since contacts C–1 are also closed, the motor 16 is connected across the buses 122a and 122b to energize the motor. As soon as the door 10 and the cam 140 move a slight angular distance in the forward door opening direction, the limit switches S–2 and S–2a are moved to the left as viewed in FIG. 5, and the condition of the various relays and position switches are as indicated in line 2 of FIG. 6. This condition of the relays continues as the door further opens until the actuating arm of position switch S–1 is momentarily actuated (to the right as viewed in FIG. 5) at, say 30° open position to energize recycle relay G and its associated time delay circuit comprising resistor 182 and capacitor 184 (line 3 of FIG. 6) through contacts A–8 and L–2 for purposes hereinafter more fully described. As the door continues to open to approximately 70° of full open position, door position switch S–4 is engaged by cam shoulder 142 to close the switch and to energize low speed relay F through contacts D–5, K–3 and shunt conductor 131, line 4, FIG. 6. The energization of low speed relay F closes switch F–1 to connect adjustable resistor 164 in parallel with motor winding 33a through contacts E–2 and D–2 to obtain reduced speed operation of the motor.

When the door reaches the 90° or full open position, limit switch S–3 is switched to the right as viewed in FIG. 5 to immediately de-energize control relay D and to energize reverse door closing relay I through closed contacts C–5, position switch S–3, contacts H–5, J–2, A–6, E–5, and G–3. The de-energization of control relay D also short circuits motor winding 33a of motor 16 through contacts C–3, H–2, D–3 and E–3 to positively stop the motor 16.

The shifting of switch S–3 to the right also completes the circuit to locking relay J through contacts C–5, H–5, and resistor 170. Since reverse door opening relay I is energized, contacts I–6 are closed and contacts I–7 are opened to connect resistor 172 and capacitor 174 in parallel with locking relay J to delay the effective energization thereof. The energization of locking relay J opens contacts J–1 to de-energize the motor 16 and simultaneously closes the contacts J–3 to energize solenoid brake 12 to lock the spindle 22 in 90° full open position. The energization of locking relay J further opens contacts J–2 to de-energize reverse door opening relay I and leaves the relays and door position switches as indicated on line 5 of FIG. 6. For so long as traffic engages either the entrance carpet 36 or safety carpet 40, solenoid brake 12 will be energized and the door positively locked in open position. In this connection, since recycle relay G is then energized, contacts G–1 are closed and G–2 are opened to disconnect safety switch 42 from safety carpet relay B and to connect it to act in the same manner as entrance carpet switch 38 in maintaining the door in the open position.

When there is no longer any traffic through the doorway, both entrance carpet switch 38 and safety carpet switch 42 are open to de-energize entrance carpet relay A. This in turn opens contacts A–1 which are in series with forward motor relay C which is de-energized after a time delay resulting from the discharge of capacitor 160 through resistor 162 and relay C.

With relay C de-energized, contacts C–6 return to their closed condition to energize reverse motor relay E through door position switches S–2 and contacts L–7, it being understood that switch S–2 is then in the left position as viewed in FIG. 5. Door position switch S–3 is held in the right-hand position by cam shoulder 142 when the door is in the 90° open position. However, the de-energizing of forward motor relay C opens contacts C–5 and therefore breaks the circuit through locking relay J which was previously completed through contacts C–5, switch S–3, contacts H–5, J–4 and shunt conductor 131. This in turn opens contacts J–3 and de-energizes solenoid brake 12 to free the motor for rotation. Since control relay D is de-energized and contacts D–5 are opened, the circuit to low speed relay F is opened. In this connection, the parallel circuit to energize low speed relay F through position switch S–4 and contacts D–8, L–2, A–8 and D–6 is also open since entrance carpet relay A is de-energized and contacts A–8 are opened so that the door position switches are as indicated in line 6, FIG. 6.

Due to the energization of reverse motor relay E, contacts E–1 of motor power circuit 122 are closed to energize motor 16 to apply full line voltage across the motor fields to turn the motor in the reverse direction to close the door.

As the door moves from the full open position, door position switch S–3 is released by cam shoulder 142 to return to the left position shown in FIG. 5 and door position switch S–4 is likewise released by cam shoulder 142 when the door passes the 70° open position to cause the relays and position switches to be situated as indicated in line 7 of FIG. 6. This opens the circuit through recycle relay G which, however, continues to be energized for a preset period due to its time delay circuit comprising resistor 182 and capacitor 184. With relay G energized, contacts G–1 and G–2 of signal and safety circuit 124 are switched so that the closing of safety carpet switch 42 will cause the door to energize entrance carpet relay A to reopen the door in the forward direction.

Further closing movement of the door causes the switch S–1 to momentarily move to the right as viewed in FIG. 5 by its engagement with notch 141 to energize low speed relay F through contacts D–6, K–3 and shunt conductor 131. Simultaneously, the time delay circuit for low speed relay F comprising resistor 178 and capacitor 180 is momentarily energized through door position switch S–1, contacts A–7 and shunt conductor 131 so that the relays and position switches are as indicated in line 8 of FIG. 6. With low speed relay F energized, adjustable resistor 164 is connected in parallel with motor winding 33 through contacts F–1 and C–2 of motor power circuit 122 to reduce the speed of the motor for so long as low speed relay F is energized by its time delay circuit comprising capacitor 180 and resistor 178.

If wind or air pressure acting on the door keeps it from completely closing during the time delay provided for low speed relay F, F becomes de-energized and contacts F–1 of motor power circuit 122 reopen to disconnect resistor 164 from its parallel connection across motor winding 33 to reapply full power to close the door.

As the door reaches the zero or closed position, door position switch S–2 is shifted to the right by cam notch 141 to energize control relay D through contacts K–6, E–7, door position switch S–6 and contacts A–3. This closes contacts D–4 in the motor power circuit 122 to short the field 33 of motor 16 through contacts C–4, D–4, E–4 and C–2 to electrically stop the motor. While the shifting of switch S–2 to the right opens the circuit to reverse motor relay E, the time delay circuit of relay E, comprising capacitor 186 and resistor 188, continues to energize relay E briefly to maintain contacts E–4 closed to effect the shorting of field 33 of motor 16 and thereafter the contacts E–1 open to disconnect motor 16. Simultaneously, the opening of contacts E–7 or E–6 interrupt current to control relay D and contacts E–8 are closed to energize locking relay J through contacts C–6, position switch S–2, contacts K–6, E–8 and shunt conductor 131 which in turn closes contacts J–3 to energize solenoid brake 12 (line 10, FIG. 6).

From an examination of FIG. 6, it will be observed that as the door moves to its closed position in returning after opening in the forward direction, recycle relay G is energized until position switch S–4 is released by cam shoulder 142 and thereafter for a period of time determined by the time delay circuit for relay G comprising capacitor 184 and resistor 182. Referring to the signal and safety circuit 124, it will be noted that contacts G–1 and G–2 are effective when recycle relay G is energized to cause the closing of exit carpet contacts 42 as well as entrance carpet contacts 38 to energize entrance carpet relay A to recycle the door to its open position. After relay G is de-energized, only entrance carpet switch 38 will energize relay A.

Another feature of this invention is that the door will open in the reverse direction, or the direction away from traffic passing onto exit or safety carpet 40 (to close switch 42) after recycle relay G is de-energized and before zero position switch S–2 is actuated by notch 141 when door 10 is fully closed. Referring to line 9 of FIG. 6, it will be observed that reverse motor relay E is energized. The closing of switch 42 of the signal and safety circuit 124 energizes safety carpet relay B. With safety carpet relay B energized, reverse door opening relay K is energized through door position switch S–1, switch SS, contacts J–5, B–7 and shunt conductor 131. Under these circumstances, as shown in line 9 of FIG. 6, low speed relay F is energized for low speed operation, as hereinbefore described, by its own time delay circuit. In the event that the period of time delay has expired, low speed relay F is maintained in its energized position since contacts K–5 are closed to complete a circuit therethrough through resistor 190, contacts L–4, D–6, H–6 and shunt conductor 131 to assure that the door will move past its fully closed position at reduced speed.

As door position switch S–2 engages cam notch 141, the relays and position switches are as indicated in line 11 of FIG. 6 with position switch S–2 momentarily returned to the right by engagement with notch 141. During the momentary switching of S–2, the reverse motor relay E is energized by its time delay circuit and thereafter is energized through contacts K–7. In addition, with contacts K–6 and E–8 open, locking relay J cannot be energized at zero door position which prevents solenoid brake 12 from stopping the motor. As the door passes through the zero position, switch S–2 is actuated to the left. In addition, door position switches S–5 and S–6 are actuated by cam shoulder 143 and are shifted to the right and left, respectively. The shifting of switch S–5 to the right completes the circuit through reverse door opening relays H and L through shunt conductor 133 and contacts A–3 so that the relays and position switches are as indicated on line 12 of FIG. 6.

With reverse control relay L energized, contacts L–3 are closed to energize recycle relay G through contacts K–5, resistor 190 and contacts I–5 and L–3. The resistor 190 reduces the rate of energization of relay G so that it is energized sufficiently to actuate its contacts when the door is opened a predetermined amount in the reverse direction, say 30°. When recycle relay G is energized, contacts G–1 and G–2 of the signal safety circuit 124 are switched to de-energize safety carpet relay B and to energize entrance carpet relay A as indicated in line 13 of FIG. 6, it being understood that contacts 42 continue to be closed by traffic on the safety carpet 40.

As the door moves to a position of, say, 70° open, door position switch S–1 is shifted to the right by cam shoulder 142. This de-energizes reverse door opening relay K and energizes low speed relay F through contacts D–6, K–3 and shunt conductor 131 as indicated in line 14 of FIG. 6. The energizing of low speed relay F causes contacts F–1 of motor power circuit 122 to connect resistor 164 in parallel with motor field 33 through contacts F–1 and C–2.

As the door 10 reaches the full open position in the reverse opening direction, door position switch S–2 is actuated by cam shoulder 142 and shifted to the right as shown in FIG. 5. This in turn opens the circuit to reverse motor relay E which, however, is kept energized for a period of time by its time delay circuit. Control relay D is energized through contact C–6, position switch S–2 and contacts K–6, E–7, E–6, and G–3. This disconnects the circuit through low speed relay F by opening contacts D–6 which in turn open contacts F–1 to remove resistor 164 from a parallel connection across motor coil 33. Moreover, a short circuit is thrown across motor coil 33 through contacts C–4, D–4, E–4 and C–2 to electrically stop the door. After the time delay, reverse motor relay E is de-energized and contacts E–7 and E–6 open to de-energize control relay D. The de-energization of reverse motor relay E also causes contacts E–8 to close to energize locking relay J (and thereby closes contacts J–3 to energize solenoid brake 12) through contacts C–6, position switch S–6 and contacts K–6, E–8 and the shunt conductor 131 to leave the relays and position switches in their final positions indicated in line 15 of FIG. 6.

The door will remain open for so long as either switch 38 or 42 of the signal and safety circuit 124 are closed by traffic to maintain entrance carpet relay A energized. When both carpets are cleared, relay A is de-energized and reverse door closing relay I is energized through contacts S–5, A–5, E–5 and G–3. This closes contacts I–2 to energize forward motor relay C through resistor 192 and contacts I–2, H–4 and B–1. Because resistor 192 is placed in series with relay C, there is a time delay before relay C is sufficiently energized to actuate its contacts. When relay C is sufficiently energized to actuate its contacts, the relays and position switches are as indicated in line 15 of FIGURE 6. The energization of relay C de-energizes locking relay J by opening contacts C–6. With relay C energized and relay J de-energized, contacts C–1 and J–1 of the motor power circuit 122 are closed to apply full power across motor 16 to cause the motor to rotate its shaft 17 and cam 140 in the clockwise direction as viewed in FIG. 3. Movement of the door and cam 140 from full open position in the reverse direction causes the cam shoulder 142 to engage door position switch S–2 to shift it to the left to leave the relays and position switches as indicated in line 17 of FIG. 6. The door continues to move under full power to close the door and door position switch S–1 moves to the left as shoulder 142 passes thereby.

The switching of door position switch S–1 to the left opens the circuit to low speed relay F which continues to be energized for a period of time to, say, until the door is 30° open, due to its time delay circuit comprising capacitor 180 and resistor 178. The de-energization of relay F connects resistor 164 across motor coil 33a through contacts F–2, I–1, D–3 and E–3 to cause the door to continue to close under reduced power. The de-energizing of relay F in turn results in the de-energization of recycle relay G by opening the circuit through contacts F–5, I–4 and L–3. Recycle relay G will continue to be energized for a further period of time while dissipating the electrical energy stored in capacitor 184 of its time delay circuit for purposes hereinafter more fully described. Thereafter, the relays and position switches are as indicated in line 19 of FIG. 6.

When the door reaches its zero or closed position, door position switch S–2 is moved to the right by cam notch 141 and door position switches S–5 and S–6 are respectively moved to the left and right by cam shoulder 143. However, reverse control relays H and L continue to be energized through contacts C–5, G–5, K–2, L–1, A–5, shunt conductors 133 and 132. Reverse door closing relay I is de-energized, however, by the actuation of position switch S–6 to break its circuit in parallel with relay H through contacts E–5, G–4, S–6 and shunt conductor 132. When door position switch S–6 is moved to the right, control relay D is energized through contacts C–5, door position switches S–3 and S–6 and shunt conductor 132, it being understood that while the de-energization of relay I breaks the circuit through forward motor relay C by opening switch I–2, relay C continues to be energized for a period of time while dissipating the stored energy in capacitor 160. With relays C, D and H energized, motor winding 33a momentarily is short circuited to electrically stop the motor 16 through contacts C–3, H–1 and D–2. Then contacts C–5 open to de-energize relay D and reverse control relays H and L and contacts C–6 close to energize locking relay J through contacts C–6, door position switch S–2, contacts K–6, E–8 and shunt conductor 131. This in turn closes contacts J–3 to energize solenoid brake 12.

A further feature of this invention is that means are provided for assuring that the drive motor will positively drive and locate the door to its closed or zero position despite any variations such as wind or stack pressures which may affect the movement of the door. Such servo-centering of the door at its zero position is automatically accomplished and the door is positively braked by the motor and electrically locked at the zero position regardless of the direction in which the door closes.

For example, if there is a wind which increases the load on the motor as it is moving the door counterclockwise toward closed position from the forward opening direction, the time delay relay for low speed relay F may result in the de-energization of relay F before the door reaches the fully closed position. Under such circumstances, reverse motor relay E continues to be energized through contacts C–6, position switch S–2, and contacts L–7 since the position switch S–2 remains in the left-hand position during such door closing movement until the cam notch 141 causes the switch S–2 to shift to the right at zero position. In other words, the position switches and relays are as indicated in line 9 of FIG. 6 except that relay F has become de-energized. Under these circumstances, full power is applied to the motor through closed contacts E–1 of the motor power circuit 122 to continue the rotation of cam 140 in the counterclockwise direction until position switch S–2 engages notch 141. In the event that the motor drives the door past the zero position, switch S–2 will be shifted momentarily to the right to energize control relay D through contacts K–6, E–7, switch S–6 and shunt conductor 132, it being understood that the time delay circuit for reverse motor relay E, comprising capacitor 186 and resistor 188, continues to maintain relay E in an energized state for a short period of time (line 1, FIG. 7).

The energizing of relay D shorts motor winding 33 through contacts C–4, D–4, E–4 and C–2 of the motor power circuit 122 to electrically brake the door. In the event that the electrical braking of the door under such circumstances, or any other circumstances, does not stop the door in zero position, the position switch S–2 will be shifed to the left and position switches S–5 and S–6 shifted to the right and left, respectively. The shifting of position switch S–2 immediately de-energizes control relay D to open the above-mentioned short circuit of motor winding 33 and the closing of switch S–5 momentarily energizes reverse control relays H and L through shunt conductors 133 and 132, and again energizes relay D through S–5, A–5, L–1, K–2, G–5, S–3, E–6, G–4 and S–6. While position switch S–2 is shifted to the left, reverse motor relay E is de-energized (since contacts L–7 are open) after the energy stored in the time delay capacitor 186 is discharged through the relay E. With relay E de-energized, reverse door closing relay I is energized through position switch S–5 and contacts A–5, E–5, G–4, a rectifier, position switch S–6, and shunt conductor 132. This, in turn, closes the circuit to energize forward motor relay C after a time delay through resistor 192, contacts I–2, H–4 and B–1 to place the relays and position switches in the condition shown in line 2 of FIG. 7.

In the motor power circuit 122, motor 16 is energized through contacts J–1 and C–1 to apply power across the motor in the forward direction. When the door returns to the zero position, position switches S–2, S–5 and S–6 are shifted to their right, left and right positions, respectively. The shifting of door position switch S–6 to the right breaks the circuit to reverse door closing relay I which is immediately de-energized. While the opening of position switch S–5 breaks a circuit to relays H and L, these relays continue to be energized through contacts C–5, G–5, K–2, L–1, A–5 and shunt conductors 133 and 132. The de-energization of relay I opens the circuit to forward motor relay C by opening contacts I–2. However, relay C continues to be energized briefly during the discharge of its time delay capacitor 160.

The shifting of position switch S–6 to the right also closes the circuit to control relay D through contacts C–5, position switch S–3, position switch S–6 and contacts A–3. With C and D relays both energized, a short circuit is thrown across motor winding 33a through contacts C–3, H–1 and D–2 to electrically brake the motor 16 and stop the door. After the energy stored in the time delay circuit for forward motor relay C is de-energized, contacts C–5 open to de-energize relays D, H and L. Contacts C–6 simultaneously close to energize locking relay J through position switch S–2, contacts K–6, E–8 and shunt conductor 131 to return the relays and switches in the position shown in FIG. 7, line 3.

In the event that the door should overtravel, during closing in this clockwise direction as, for example, due to a sudden change in wind or stack pressure, door position switch S–2 will again become out of registry with cam notch 141 and become shifted to the left to energize the reverse motor relay E to close contacts E–1 of the motor power circuit 122 (FIG. 6, line 9). This will apply full power to reverse the motor and again return it to the zero position, it being understood that when reverse motor relay E is energized, contacts E–8 are open to prevent locking relay J from being energized to apply solenoid brake 12. The motor will then be electrically braked and then locked by solenoid brake 12 as hereinbefore described in connection with the normal closing of the door after opening in the forward direction (line 10, FIG. 6).

To summarize the servo-centering operation, in the event the door 10 is not stopped and locked by solenoid brake 12 at zero position at which time the door position switch S–2 is in registry with cam notch 141 during any operation while power is on, the relays and position switches will either be in the condition indicated in FIG. 6, line 9, or FIG. 7, line 2, to positively control the motor to move the door to the zero position.

Significant to this invention is the inclusion of control features for providing for different modes of operation of the door under all circumstances and door positions for ensuring traffic safety while facilitating the operation of the door for maximum convenience.

To carry out the foregoing, it will be apparent that when the door is in zero position, the relays and position switches are as indicated in line 1, FIG. 6. Traffic passing onto exit carpet 40 will close switch 42 to energize safety carpet relay B. This will cause contacts B–1 to open so that forward motor relay C cannot be energized to initiate the door opening cycle even though other traffic passes onto entrance carpet 36 to close the switch 38 to in turn energize entrance carpet relay A. Since relay C cannot be energized, contacts C–1 of the motor power circuit 122 cannot be closed and contacts C–6, which are in series with locking relay J, cannot be opened. Where touch control switch 19 is not used, contacts B–6 open when safety carpet relay B is energized to de-energize solenoid brake 12 and the door is rendered free-wheeling for easy movement from zero position. It is desirable to provide touch control switch 19 so that the door will remain at zero or closed position when, say, a child is jumping on and off the exit carpet 40 and wind or stack pressure might otherwise cause the door to swing. Providing touch control switch 19 in parallel with contacts B–6 keeps the solenoid brake 12 energized when an object is on exit carpet 40 to energize relay B and open contacts B–6 unless touch control switch 19 is also opened to indicate that the user intends to pass through the doorway. Where touch control switch 19 is not opened, the door will be locked in the zero position and will not move until the traffic leaves the exit carpet to de-energize safety carpet relay B.

Where the door is opening in the forward direction, that is to say, while sweeping across safety carpet 40 or moving the cam 140 clockwise as viewed in FIG. 3, and has moved less than a predetermined amount of, say, 30° which would leave sufficient time for traffic to pass onto the exit carpet 40 into the path of the door, the relays and position switches will be in the conditions indicated in line 2 of FIG. 6. Under such circumstances, with traffic on the exit carpet, the control system will cause the door to be positively stopped by the motor and then become freewheeling. With relays A and B both energized, bus 128b of the motor control circuit will be broken by contacts B–5 and A–3 to de-energize control relay D immediately. Contacts B–1 will also open to break the circuit to forward motor relay C which continues to be energized briefly during the dissipation of the energy stored in capacitor 160 of its time delay circuit. Under these circumstances, a short is applied across motor field 33a through contacts C–3, H–2, D–3, E–3 to electrically brake the motor and stop movement of the door. The energizing of safety carpet relay B also immediately closes the circuit to energize reverse door opening relay K through position switch S–1, switch SS, contacts J–5 and B–7 and shunt conductor 131 to open contacts K–6 to prevent locking relay J from being energized. Relay K is locked in so that the door becomes freewheeling and can be manually moved in either direction for passage of traffic. The energization of relay B also de-energizes master relay M after the time delay required for dissipating the capacitor 191 of its time delay circuit. While the time delay for master relay M is made longer than the time delay for forward motor relay C, the de-energizing of master relay M opens contacts M–3 to break the bus 128a of the motor control circuit to prevent the control circuit from applying power to the motor until both relays A and B are de-energized by he clearing of all traffic from both entrance carpet 36 and exit carpet 40 to close the circuit for master relay M through contacts A–2 and B–3.

After the door is opened more than 30° in the positive direction, the recycle relay G is energized which will disconnect safety switch 42 from safety carpet relay B and cause it to energize entrance carpet relay A. As indicated in lines 3–8 of FIG. 6, recycle relay G is energized whenever the door is more than 30° open in the forward direction so that the door will return to its full open position when traffic passes onto either of the carpets and will thereafter return to the zero position in the usual manner hereinbefore described. After the door position switch S–1 has engaged the cam notch 141 to momentarily energize low speed relay F and its time delay circuit, and recycle relay G is de-energized, the condition of the relays and position switches is as indicated on line 9 of FIG. 6. At this time, if traffic passes onto exit carpet 40, safety carpet relay B will be energized by the closing of switch 42 to in turn energize reverse door opening relay K as indicated on line 5 of FIG. 7. The effect of this is to lock in relay F so that it will continue to energize the motor for low speed (and low torque) so that full power will not be reapplied to close the door after a preset delay. Low speed relay F is locked in through contacts K–5, resistor 190, contacts L–4, D–6, H–6 and shunt conductor 131. By virtue of the locking in of relay F so that full motor torque cannot be applied to close the door after a predetermined time delay, a pedestrian who might attempt to squeeze between the door and its jamb as it is swinging shut is protected against injury.

If a pedestrian or vehicle is on exit carpet 40 and not between the closing door and its jamb, the motor will continue to move at slow speed toward and past its zero position (reverse motor relay E being energized and contacts E–1 of motor power circuit 122 being closed). Since reverse door opening relay K is closed, contacts K–6 are opened so that as switch S–2 registers with cam notch 141 control relay D cannot be momentarily energized and locking relay J likewise is not energized to activate solenoid brake 12 to hold the door in zero position. Rather, the motor continues to power the door past the zero position until switch S–2 is shifted to the left as the cam notch 141 moves out of registry therewith in the counterclockwise direction to continue the energization of reverse motor relay E. Simultaneously with S–2, position switches S–5 and S–6 are shifted to the right and left, respectively, to immediately energize relays H and L and to de-energize low speed relay F by opening contacts H–6 which also disconnects relay F from its time delay circuit, and the relays and position switches are then in the condition indicated in line 6 of FIG. 7.

With relay F de-energized, contacts F–1 of the motor power circuit 122 are opened, and the motor subjected to full power to open the door in the negative or counterclockwise direction and to cycle it to the closed position in response to traffic as hereinbefore described.

As the door continues to move in the negative or counterclockwise direction, further means are provided for assuring traffic safety.

As the door is moving between 1° and, say, about 30° in the negative direction, the condition of the relays and contacts is as indicated in line 6 of FIG. 7. Under such circumstances, if traffic passes onto the entrance carpet 36 over which the door is sweeping, the carpet 36 acts as a safety carpet. Carpet switch 38 energizes entrance carpet relay A which opens contacts A–3 to immediately de-energize relays H and L. In addition, control relay D is immediately energized through contacts A–1 and K–1, G–5 position switch S–3, and contacts E–6 and B–4. This produces a short circuit across motor winding 33 to immediately stop the motor through contacts C–4, D–4, E–4, and C–2 of motor power circuit 122.

The energization of relay A also opens contacts A–2 to open the circuit through master relay M which continued to be energized during the dissipation of the energy stored in capacitor 191 of its time delay circuit. After the time delay passes, contacts M–3 open bus 128a to de-energize the control system until both entrance carpet relay A and safety carpet relay B are de-energized by the removal of traffic from both the entrance and exit carpets. The breaking of the bus 128a by the opening of contacts M–3 prevents the energizing of locking relay J so the door is freewheeling until master relay M is energized. The opening of contacts M–3 also causes the de-energization of relays K, D and E to leave the relays and position switches in the positions indicated in line 7 of FIG. 7.

When both the entrance and exit carpets are cleared, relays A and B are immediately de-energized as indicated on line 8 of FIG. 7. This results in the re-energization of master safety relay M through contacts A–2 and B–3 and the re-energization of relays H and L through contacts A–2, M–2, S–5, shunt conductors 133 and 132. Also, reverse door closing relay I is energized by being placed in parallel circuit relationship with reverse control relay H through contacts A–5, E–5, G–4, a rectifier, position switch S–6 and shunt conductor 132. With the closing of relay I, forward motor relay C is connected to be energized through resistor 192, contacts I–2, H–4 and B–1 with resistor 192 delaying the full energization of relay C to provide a time delay after which the motor is energized through contacts J–1 and C–1 to rotate in the clockwise direction to close the door.

As indicated above, with reverse control relay L energized, contacts L–3 are closed to energize recycle relay G through contacts K–5, resistor 190 and contacts I–5 and L–3 with resistor 190 reducing the rate of energization of relay G so that it is energized sufficiently to actuate its contacts when the door is opened a predetermined amount in the reverse direction, say, 30°. Whenever recycle relay G is energized, contacts G–1 and G–2 of the signal and safety circuit 124 are switched to de-energize safety carpet relay B and to cause either entrance carpet switch 38 or exit carpet switch 42 to energize entrance carpet relay A. Under such circumstances, traffic on either the entrance or the exit carpet will not stop the opening movement of the door. Rather, the door will continue in the door opening position in the usual manner for so long as relay G is energized.

Since FIG. 6 illustrates that recycle relay G is energized whenever the door is opened beyond a preset amount of, say, 30° and 20°, respectively, when it is in the process of opening or closing, the door will return to the open position to allow the passage of traffic in both directions. As explained above and as indicated on line 18 of FIG. 6, door position switch S–1 is shifted to the left by cam shoulder 142 as the cam 140 rotates in the clockwise direction during door closing from the negative position at approximately 70° open position as the door is closing in a clockwise direction. This opens the circuit to low speed relay F which continues to be energized for a period of time, say, until the door is approximately 30° open due to its time delay circuit comprising capacitor 180 and resistor 178. The de-energization of relay F connects resistor 164 across motor coil 33a through contacts F–2, I–1, D–3 and E–3 to cause the door to continue to close under reduced power. The de-energization of relay F in turn causes the recycle relay G to become de-energized (after its time delay capacitor 186 is discharged at, say, 20°) by opening the circuit through contacts F–5, I–4 and L–3.

After recycle relay G is de-energized, traffic passing onto entrance carpet 36 and closing switch 38 to energize entrance carpet relay A will not cause the door to recycle. Rather, the door will continue to close at reduced power to prevent injury to a pedestrian or other object between the closing door and the jamb with the relays and position switches as indicated on line 9 of FIG. 7. As the door moves to the zero position, position switch S–2 will engage notch 141 and momentarily move to the right. However, since forward motor relay C and entrance carpet relay A are energized, contacts A–5 open the cicuit to relays H and L. Thus, contacts H–1 will be open at zero door position to prevent the electrical braking of the motor, and contacts C–6 are open to prevent locking relay J from energizing solenoid brake 12. The motor therefore continues past the zero position until position switch S–2 returns to the left, and position switches S–5 and S–6 shift to the left and right, respectively, to de-energize relays H, I and L and to energize control relay D to open contacts D–3 to disconnect resistor 164 from its parallel relation with respect to motor winding 33a so that full power is applied to motor 16 to open the door in the forward or clockwise direction whereupon the door recycles in the forward direction and ultimately returns to the close position as hereinbefore described in response to traffic.

As indicated above, with the power turned on and the door closed and no traffic on the carpet 34, locking relay J is energized to close switch J–3 to energize solenoid brake 12 to lock the door in position to keep the door closed against any force which may be applied such as high wind or high stack pressure. The locking force may be varied as desired by the adjustment of resistor 15 which is in series with solenoid brake 12. This invention accomplishes this requirement while at the same time providing for emergency exit under panic conditions. This is accomplished in the following manner. Whenever traffic passes onto safety carpet 40 and closes switch 42 when the door is closed, safety carpet relay B is energized. Referring to FIG. 5, the energization of relay B opens contacts B–6 to disconnect power from the full wave rectifier for solenoid brake 12 when touch control switch 19 is not used with the result that the brake is released and the door may easily be manually pushed in the outward or reverse door opening direction. Where touch control switch 19 is used, it must also be opened as will automatically occur when the door is manually pushed in the reverse door opening direction under panic conditions to release solenoid brake 12 so that the door may be easily moved from its zero position under such conditions. As soon as the door is pushed approximately 1°, door position switches S–2, S–5 and S–6 are respectively shifted by cam notch 141 and cam shoulder 143, respectively, so that the relays and position switches are conditioned as indicated at line 12 of FIG. 6. Thereafter, the door will automatically open under motor power in the counterclockwise direction as hereinbefore described.

The door also provides for emergency exit in the event of power failure. If the power failure affects the entire control circuit of FIG. 5, solenoid brake 12 is automatically de-energized to render the door readily movable in any direction. If the power failure affects only the motor control circuit 128, locking relay J will be de-energized to open contacts J–3 and release solenoid brake 12. Thus, any pedestrian pushing on the door 10 may manually swing it outwardly for emergency or panic exit.

It is important that the door 10 be returned to its closed position after emergency exit from the building, particularly in the event of a fire in the building. This invention provides additional means for achieving this objective. Referring to FIGS. 4 and 5, there is provided a spring biased plunger 116 which is engageable with a groove 115 of one of a pair of interfitting washers 110 and 112. Under normal conditions with power on, an electrical solenoid 117 is energized and holds the plunger 116 out of engagement with slot 115. Upon power failure, however, the solenoid 117 is de-energized and the plunger 116 engages the slot 115 when the door is in zero position to prevent the rotation of cam washer 110. With power turned off or in the event of power failure, the solenoid brake 12 is likewise de-energized and the door may be manually opened in either direction against the spring pressure provided by the compression of the Belleville washers 113 as the cam surfaces of cam washers 110 and 112 rotate with respect to each other. Upon release of manual pressure holding door 10 open, the mating cam surfaces 111 and 119 produce a torque to return the door to its closed or zero position. Since the spring force provided by Belleville washers 113 reduces as cam 110 moves downwardly as viewed in FIG. 2 to reduce the compression of the springs 113, the mating cam surfaces of cam washers 110 and 112 are provided with a steeper slope as the door approaches the zero position to compensate for the reduced spring force to provide a relatively uniform or increasing torque as the door approaches the closed position under the power provided by the door closer arrangement of FIG. 4.

If desired, a touch control 19 illustrated in dotted lines of FIG. 5 may be utilized for use in conjunction with the emergency exit of the operation of the door. Such a feature is desirable under high wind or high stack pressure conditions, since as seen in FIG. 5, it is necessary to open the switch 19 as well as contacts B–6 in order to release brake solenoid 12. This ensures that the solenoid brake 12 will not be released under emergency conditions until traffic is both on the carpet 40 to energize safety carpet relay B and contacting push bar 19 to open both of the parallel switches B–6 and 19. Since this requires contact with the door before the brake is released, high wind or stack pressure cannot actuate the door.

As described above, once traffic is cleared from the signal area, the door will cycle to its closed or zero position automatically when power is on through the operation of motor 16 in the usual manner.

Another feature of this invention is that it may be connected for two-way operation so that the door will swing away from traffic approaching the doorway and passing onto mat 36 or mat 40. All that is required for this operation is the shifting of selector switch SS to the left as shown in FIG. 5. With the switch SS so shifted, traffic passing onto the entrance mate 36 to close switch 38 and energizing entrance carpet relay A will energize the same relays (including forward motor relay C) which would have been energized had the selector switch been left in the right position since the selector switch is connected in series with open contacts B–7, see line 2, FIG. 6, and the door will open in the forward direction through the usual cycle. However, if traffic first passes onto carpet 40 and closes switch 42 to energize relay B, B–7 will be closed and reverse door opening relay K will be energized to energize reverse motor relay E through contacts K–7 (rather than forward motor relay C) and cause the door to open in the reverse or counterclockwise direction as indicated on line 11 of FIG. 6. The door, after initiating either cycle will continue as hereinbefore described.

From the foregoing it is apparent that this invention provides an automatic powered door operator for swinging doors meeting all the safety, traffic, emergency and convenience requirements of diverse installations including the capability of optional modes of operation to meet the wishes of the purchaser and the diverse performance requirements of Government codes.

As will be apparent to persons skilled in the art, various modifications and adaptations of the structure above-described will become readily apparent without departure from the spirit and scope of the invention, the scope of which is defined in the appended claims.

The embodiments of the invention in which an exclusive property or privilege is claimed are defined as follows:

1. An electromechanical door operator comprising a reversible drive including a drive motor for powering a swinging door through door opening and closing cycles and a traffic responsive control therefor, said traffic responsive control including a brake energized to hold the door in closed position, a sensor for sensing door position and electric circuit means responsive to said sensor for de-energizing the brake and for energizing said motor to return the door to closed position when the door is displaced therefrom in either direction.

2. A device as recited in claim 1 wherein said sensor comprises a cam movable with the door and provided with a cam surface for actuating an electric switch when the door is displaced from the closed position.

3. A device as recited in claim 1 wherein said brake is solenoid operated to apply the brake only when the solenoid is energized.

4. A device as recited in claim 1 wherein said control further includes switching means actuated by traffic approaching the door from the exit side thereof for releasing said brake for emergency reverse opening of the door.

5. A device as recited in claim 4 wherein said switching means comprises a first switch actuated when traffic approaches the door from the exit side thereof and a second switch actuated when traffic contacts the door, said first and second switches being connected in circuit relationship whereby the actuation of both switches is necessary to release the brake.

6. A device as recited in claim 5 wherein said first and second switches are connected in parallel and are opened to de-energize the brake.

7. A device as recited in claim 4 wherein said control further includes means for energizing the motor to power the door in the reverse opening direction after the door is manually moved from its closed position.

8. A device as recited in claim 1 including a door closer which is disconnected from the door when power is on but is automatically connected to the door when power is off, said closer being effective when connected to the door to return the door to the closed position after it is displaced therefrom.

9. A device as recited in claim 8 wherein the door closer includes a pair of cam washers resiliently biased toward each other to urge the door toward a closed position upon relative movement between the washers when the door is displaced from the closed position in either direction and a solenoid actuated stop engageable with one of said pair of cam washers when power is off.

10. A device as recited in claim 9 wherein said cam washers have compound mating cam surfaces wherein the slope of the engaging portions thereof increases as the door approaches the closed position.

11. A device as recited in claim 1 wherein said control includes means for energizing the motor for operation as a brake when the door reaches its zero position.

12. A device as recited in claim 11 wherein said control further comprises time delay means for limiting the period of time the motor acts as a brake and for immediately applying a mechanical brake to lock the door in zero position.

13. A device as recited in claim 12 wherein said motor is de-energized when said mechanical brake is applied to lock the door.

14. A device as recited in claim 11 wherein said sensor includes means responsive to the door position when the door is fully open to energize the motor so that the motor serves as a brake and then to apply a mechanical brake to lock the door in the door open position for so long as the traffic through the door continues.

15. A device as recited in claim 14 wherein said motor is de-energized when said mechanical brake is applied to lock the door.

16. A device as recited in claim 1 wherein said control includes further electric circuit means for energizing the motor to power the door through a door opening and closing cycle in the opening swinging direction away from traffic approaching the doorway regardless of the direction of approach of the traffic.

17. A device as recited in claim 1 wherein said sensor includes a cam movable with the door and operable to actuate a plurality of door position switches for controlling the operation of the door in response to traffic through the door, said cam and said door position switches being so constructed and arranged as to provide for the reversal of the direction the door is swung by flipping the cam upside down without changing the relative angular position of the zero position of the cam when the door is closed and selectively changing the input connections from the door position switches and the electric circuit means.

18. A device as recited in claim 1 including electric circuit means for energizing said motor to act as a brake to stop the door whenever the door reaches its full open or closed positions or whenever traffic responsive switches are energized to stop the closing movement of the door and recycle the same to the open position.

19. An electromechanical door operator comprising a reversible drive including a motor for powering a swinging door through door opening and closing cycles and a traffic responsive control therefor, said traffic responsive control including first switch means actuated by traffic approaching the door for passage therethrough in a first direction and second switch means actuated in response to traffic approaching the door in the opposite direction, and a switch actuated to energize the motor to operate as a brake to stop the door when both switch means are simultaneously actuated and the door is displaced in the opening direction less than a predetermined angular amount constituting only a portion of the total opening movement of the door.

20. A device as recited in claim 19 wherein the motor is energized to serve as a brake to positively stop the door when said first and second switch means are actuated simultaneously as the motor is powering the door in either opening direction from the door closed position and the door is displaced less than preselected angular distances from its closed position.

21. A device as recited in claim 19 wherein said control includes means for de-energizing the motor after the door is stopped to render the door freewheeling until said first and second switch means are deactuated.

22. A device as recited in claim 21 wherein said control includes means for energizing the motor to power the door to its full open position when both said traffic responsive switches are simultaneously actuated when the door is displaced more than a predetermined angular distance from the closed position.

23. A device as recited in claim 19 wherein said control includes means for energizing the door to operate at a reduced torque for a predetermined period of time as the door is closing and is displaced less than a predetermined angular amount from the closed position, and further includes means for continuing the reduced torque operation of the motor until the door reaches the closed position when traffic approaches the door on the same side of the doorway as the closing door.

24. A device as recited in claim 23 wherein said control additionally includes means for energizing the motor to power the door past closed position and to automatically power the door through a complete door opening and closing cycle in a swinging direction opposite the next prior door opening cycle when said traffic approaches the same side of the doorway as the closing door when the door is displaced less than a predetermined angular amount from closed position.

References Cited

UNITED STATES PATENTS

| | | | |
|---|---|---|---|
| 1,018,246 | 2/1912 | Korytowski | 49—326 X |
| 2,242,706 | 5/1941 | Hanson | 49—264 |
| 2,827,284 | 3/1958 | Bunzl | 49—32 |
| 3,039,764 | 6/1962 | Heinsman et al. | 49—264 X |
| 3,237,932 | 3/1966 | Catlett | 49—138 X |

FOREIGN PATENTS

| | | |
|---|---|---|
| 712,938 | 7/1965 | Canada. |
| 934,269 | 8/1963 | Great Britain. |

DAVID J. WILLIAMOWSKY, Primary Examiner

J. KARL BELL, Assistant Examiner

U.S. Cl. X.R.

49—32, 138, 141, 264, 326, 334